United States Patent
Lo et al.

(10) Patent No.: US 11,284,385 B2
(45) Date of Patent: Mar. 22, 2022

(54) DEVICE AND METHOD FOR HANDLING A RECEPTION

(71) Applicant: ACER INCORPORATED, New Taipei (TW)

(72) Inventors: Li-Chung Lo, New Taipei (TW); Chien-Min Lee, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 85 days.

(21) Appl. No.: 16/989,847

(22) Filed: Aug. 10, 2020

(65) Prior Publication Data

US 2021/0051635 A1 Feb. 18, 2021

Related U.S. Application Data

(60) Provisional application No. 62/885,831, filed on Aug. 13, 2019.

(51) Int. Cl.
*H04W 72/04* (2009.01)
*H04J 13/16* (2011.01)
*H04L 5/00* (2006.01)

(52) U.S. Cl.
CPC ........... *H04W 72/042* (2013.01); *H04J 13/16* (2013.01); *H04L 5/0051* (2013.01)

(58) Field of Classification Search
CPC ...... H04W 72/042; H04J 13/16; H04L 5/0051
See application file for complete search history.

(56) References Cited

U.S. PATENT DOCUMENTS

| | | |
|---|---|---|
| 2018/0343653 A1 | 11/2018 | Guo |
| 2019/0037540 A1 | 1/2019 | Seo |
| 2019/0141693 A1 | 5/2019 | Guo |
| 2019/0222289 A1* | 7/2019 | Wilson ............... H04W 72/046 |
| 2019/0239093 A1 | 8/2019 | Zhang |
| 2019/0246395 A1 | 8/2019 | Huang |
| 2019/0260532 A1* | 8/2019 | Manolakos ......... H04W 72/042 |
| 2020/0045672 A1* | 2/2020 | Yang ................. H04W 72/0446 |
| 2020/0107352 A1* | 4/2020 | Tsai ....................... H04B 7/088 |
| 2020/0221432 A1* | 7/2020 | Park ...................... H04L 1/1812 |

FOREIGN PATENT DOCUMENTS

WO 2019/099659 A1 5/2019

OTHER PUBLICATIONS

Mediatek Inc., Enhancements on multi-TRP/panel transmission, 3GPP TSG RAN WG1 Meeting #95, Spokane, USA, Nov. 12-16, 2018, R1-1812349, XP051478542.

(Continued)

*Primary Examiner* — Ronald B Abelson
(74) *Attorney, Agent, or Firm* — Winston Hsu

(57) ABSTRACT

A communication device for handling a reception comprises at least one storage device and at least one processing circuit, coupled to the at least one storage device. The at least one storage device stores instructions, and the at least one processing circuit is configured to execute the instructions of: receiving a DCI from a control resource set; and receiving a PDSCH according to the DCI, wherein the DCI comprising a TCI field, and the TCI field indicating a TCI codepoint corresponding to a first TCI state and a second TCI state.

19 Claims, 17 Drawing Sheets

(56) References Cited

OTHER PUBLICATIONS

Huawei, Hisilicon, Single NR-PDCCH based non-coherent JT in Rel-15, 3GPP TSG RAN WG1 NR Ad Hoc Meeting#4, Vancouver, Canada, Jan. 22-26, 2017, R1-1800530, XP051384908.

Intel Corporation, Summary for simultaneous Tx and Rx of channels and RS, 3GPP TSG RAN WG1 Meeting #95, Spokane, USA, Nov. 12-16, 2018, pp. 1/10-10/10, R1-1813896, XP051494400.

Huawei, Hisilicon, Remaining details for DL design on multi-TRP/panel transmission for eMBB, 3GPP TSG RAN WG1 #97, Reno, USA, May 13-17, 2019, R1-1906040, XP051727497.

Qualcomm Incorporated, Details on simultaneous reception/transmission of PHY channels and RS in FR2, 3GPP TSG RAN WG1 Meeting #94bis, Chengdu, China, Oct. 8-12, 2018, R1-1811233, XP051518634.

3GPP TS 38.214 V15.6.0 (Jun. 2019); 3rd Generation Partnership Project; Technical Specification Group Radio Access Network; NR; Physical layer procedures for data (Release 15), pp. 1-105, Jun. 2019.

3GPP TS 38.321 V15.6.0 (Jun. 2019); 3rd Generation Partnership Project; Technical Specification Group Radio Access Network; NR; Medium Access Control (MAC) protocol specification (Release 15), pp. 1-77, Jun. 2019.

ZTE, Enhancements on Multi-TRP and Multi-panel Transmission, Agenda item 7.2.8.2, 3GPP TSG RAN WG1 #97, R1-1906236, Reno, USA, May 13-17, 2019.

Oppo, Enhancements on multi-TRP and multi-panel transmission, 3GPP TSG RAN WG1 Meeting #97, R1-1906287, Reno, USA, May 13-17, 2019.

\* cited by examiner

| TCI field | First TCI state | | Second TCI state | |
|---|---|---|---|---|
| | RS (e.g., for spatial QCL assumption) | RS (e.g., for time/frequency QCL assumption) | RS (e.g., for spatial QCL assumption) | RS (e.g., for time/frequency QCL assumption) |
| 00 | A0 | B0 | C0 | D0 |
| 01 | A1 | B1 | C1 | D1 |
| 10 | A2 | B2 | C2 | D2 |
| 11 | A3 | B3 | Non-available | Non-available |

FIG. 6

| CRST | First TCI state | Second TCI state |
|---|---|---|
| CRST1 | A0 | C0 |
| CRST2 | A1 | C1 |
| CRST3 | A2 | C2 |
| CRST4 | A3 | Non-available |

FIG. 11

DEVICE AND METHOD FOR HANDLING A RECEPTION

CROSS REFERENCE TO RELATED APPLICATIONS

This application claims the benefit of U.S. Provisional Application No. 62/885,831 filed on Aug. 13, 2019, which is incorporated herein by reference.

BACKGROUND OF THE INVENTION

1. Field of the Invention

The present invention relates to a device and a method used in a wireless communication system, and more particularly, to a device and a method of handling a reception.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc. For a UE and an eNB to communicate with each other in the LTE-A system, the UE and the eNB must support standards developed for the LTE-A system, such as the 3GPP Rel-1X standard or later versions.

A fifth generation (5G) system (5GS) (e.g., 5G new radio access network (5G-NR)) is an evolution of a continuous mobile broadband process to meet the requirements of 5G as introduced by International Mobile Telecommunications (IMT)-2020. The 5GS may include a radio access network (RAN) and a core network (CN). The RAN may include at least one base station (BS). The at least one BS may include an evolved Node-B (eNB) or a 5G Node-B (gNB). The eNB or the gNB may include at least one transmission point (TRP), for communicating with at least one UE and for communicating with the CN. The CN may include a MME, a SGW, an AMF, a UPF, etc., for a NAS control.

Multiple TRPs may communicate with a UE via a beamforming. The UE may use multiple receive (Rx) filters to communicate with the TRPs. However, the UE may use one of the Rx filters to receive signal from the TRPs, when the UE successfully decodes a downlink (DL) assignment. Accordingly, efficiency of resource utilization is degraded. Thus, how to receive the signal from the TRPs is an important issue to be solved.

SUMMARY OF THE INVENTION

The present invention therefore provides a device and a method for handling a reception to solve the abovementioned problem.

A communication device for handling a reception comprises at least one storage device and at least one processing circuit, coupled to the at least one storage device. The at least one storage device stores instructions, and the at least one processing circuit is configured to execute the instructions of: receiving a DL control information (DCI) from a control resource set; and receiving a physical downlink (DL) shared channel (PDSCH) according to the DCI, wherein the DCI comprises a transmission configuration indicator (TCI) field, and the TCI field indicates a TCI codepoint corresponding to a first TCI state and a second TCI state.

A communication device for handling a reception comprises at least one storage device and at least one processing circuit, coupled to the at least one storage device. The at least one storage device stores instructions, and the at least one processing circuit is configured to execute the instructions of: receiving a DL control information (DCI) from a control resource set; and receiving a physical downlink (DL) shared channel (PDSCH) according to the DCI, wherein the control resource set (CORESET) is configured with a CORESET pool index.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 is a schematic diagram of a TCI field-TCI state mapping table according to an example of the present invention.

FIG. 11 is a schematic diagram of a schematic diagram of a CORESET-TCI state mapping table according to an example of the present invention.

DETAILED DESCRIPTION

Figure 1:
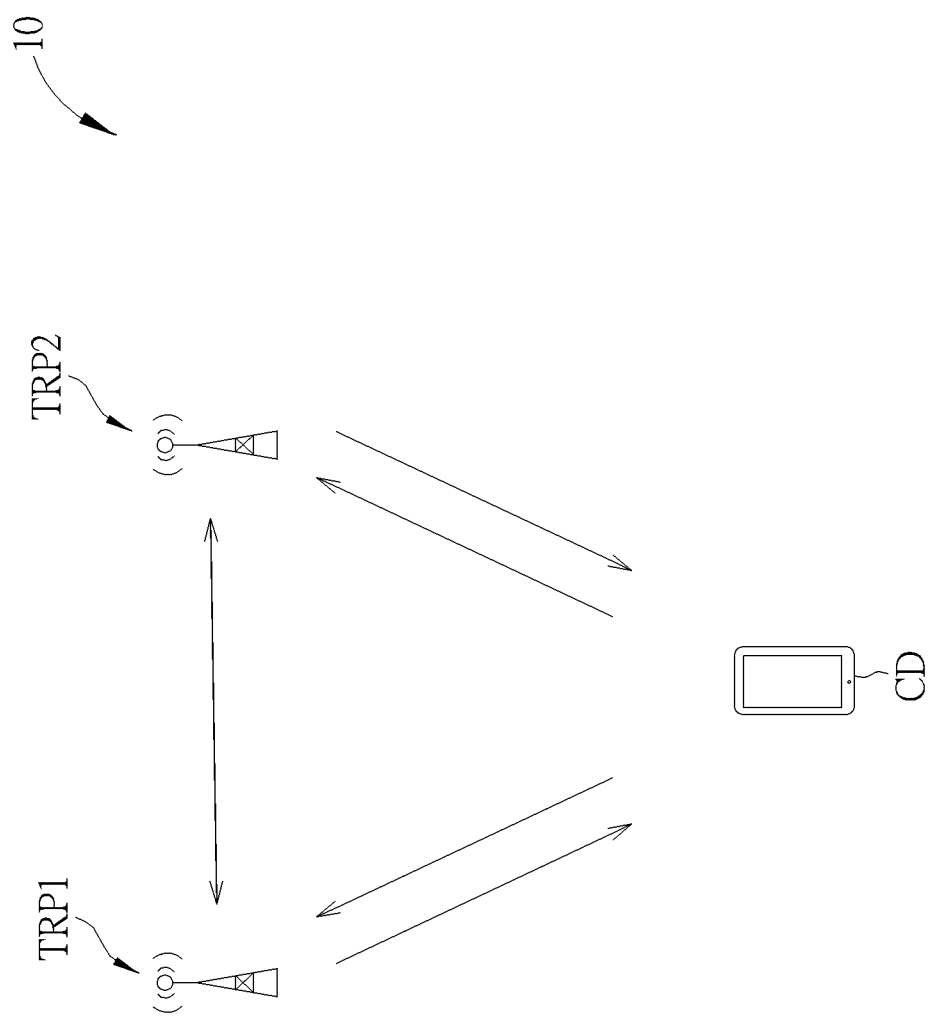
FIG. 1 is a schematic diagram of a wireless communication system according to an example of the present invention.

FIG. 1 is a schematic diagram of a wireless communication system 10 according to an example of the present invention. The wireless communication system 10 is briefly composed of transmission points (TRPs) TRP1 and TRP2 and a communication device CD. The wireless communication system 10 may support a time-division duplexing (TDD) mode, a frequency-division duplexing (FDD) mode, a TDD-FDD joint operation mode or a licensed-assisted access (LAA) mode. That is, the TRPs TRP1 and TRP2 and the communication device CD may communicate with each other via FDD carrier(s), TDD carrier(s), licensed carrier(s) (licensed serving cell (s)) and/or unlicensed carrier(s) (unlicensed serving cell(s)). In addition, the wireless communication system 10 may support a carrier aggregation (CA). That is, the TRPs TRP1 and TRP2 and the communication device CD may communicate with each other via multiple serving cells (e.g., multiple serving carriers) including a primary cell (e.g., primary component carrier) and one or more secondary cells (e.g., secondary component carriers).

In FIG. 1, the TRPs TRP1 and TRP2 and the communication device CD are simply utilized for illustrating the structure of the wireless communication system 10. Practically, each of the TRPs TRP1 and TRP2 may belong to a universal terrestrial radio access network (UTRAN) including at least one Node-B (NB) in a universal mobile telecommunications system (UMTS). In one example, each of the TRPs TRP1 and TRP2 may belong to an evolved UTRAN (E-UTRAN) including at least one evolved NB (eNB) and/or at least one relay node in a long term evolution (LTE) system, a LTE-Advanced (LTE-A) system, an evolution of the LTE-A system, etc. In one example, each of the TRPs TRP1 and TRP2 may belong to a next generation radio access network (NG-RAN) including at least one next generation Node-B (gNB) and/or at least one fifth generation (5G) base station (BS). In one example, each of the TRPs TRP1 and TRP2 may belong to any BS conforming to a specific communication standard to communicate with the communication device CD.

A NR is a standard defined for a 5G system (or 5G network) to provide a unified air interface with better performance. gNBs are deployed to realize the 5G system, which supports advanced features such as enhanced Mobile Broadband (eMBB), Ultra Reliable Low Latency Communications (URLLC), massive Machine Type Communications (mMTC), etc. The eMBB provides broadband services with a greater bandwidth and a low/moderate latency. The URLLC provides applications (e.g., end-to-end communication) with properties of a higher security and a low latency. The examples of the applications include an industrial internet, smart grids, infrastructure protection, remote surgery and an intelligent transportation system (ITS). The mMTC is able to support internet-of-things (IoT) of the 5G system which include billions of connected devices and/or sensors.

The communication device CD may be a user equipment (UE), a low cost device (e.g., machine type communication (MTC) device), a device-to-device (D2D) communication device, a narrow-band internet of things (IoT) (NB-IoT), a mobile phone, a laptop, a tablet computer, an electronic book, a portable computer system, or combination thereof. In addition, each of the TRPs TRP1 and TRP2 and the communication device CD can be seen as a transmitter or a receiver according to direction (i.e., transmission direction), e.g., for an uplink (UL), the communication device CD is the transmitter and each of the TRPs TRP1 and TRP2 is the receiver, and for a downlink (DL), each of the TRPs TRP1 and TRP2 is the transmitter and the communication device CD is the receiver.

Figure 2:
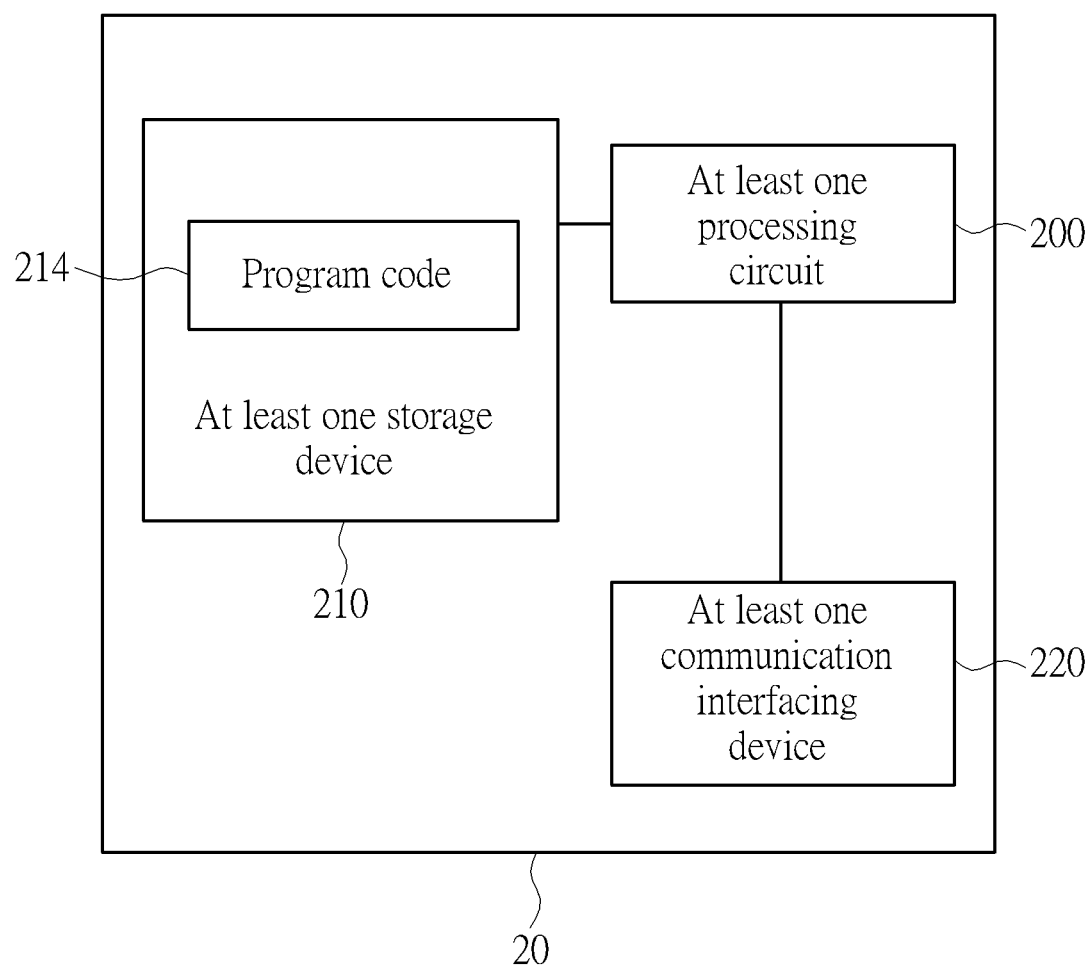
FIG. 2 is a schematic diagram of a communication device according to an example of the present invention.

FIG. 2 is a schematic diagram of a communication device 20 according to an example of the present invention. The communication device 20 may be the communication device CD or any of the TRPs TRP1 and TRP2 shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

Figure 3:
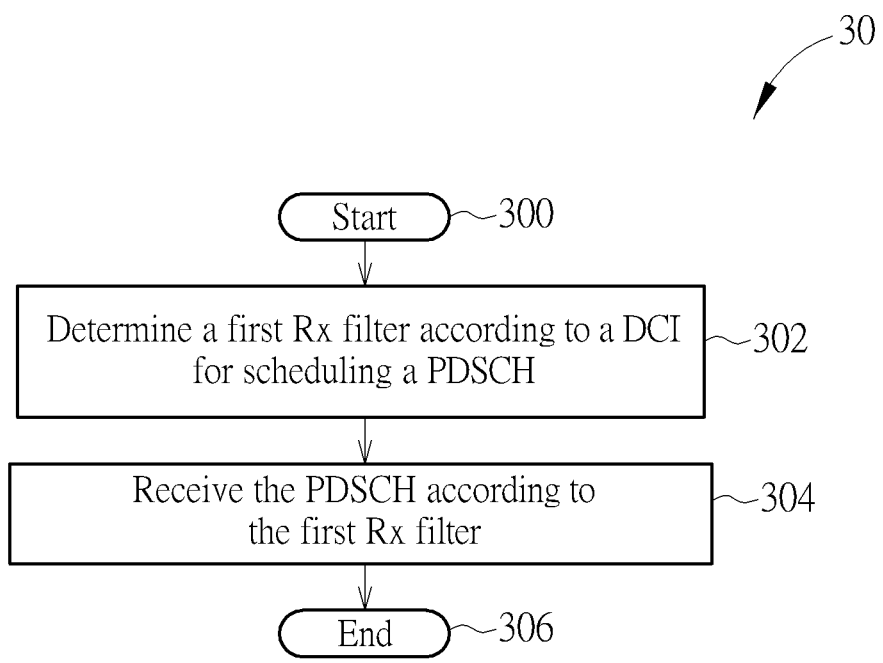
FIG. 3 is a flowchart of a process according to an example of the present invention.

FIG. 3 is a flowchart of a process 30 according to an example of the present invention. The process 30 may be utilized in a communication device (e.g., the communication device shown in FIG. 1), to handle a reception. The process 30 may be compiled into the program codes 214 and includes the following steps:

Step 300: Start.

Step 302: Determine a first receive (Rx) filter according to a DL control information (DCI) for scheduling a physical DL shared channel (PDSCH).

Step 304: Receive the PDSCH according to the first Rx filter.

Step 306: End.

According to the process 30, the communication device determines (e.g., calculates, obtains, selects and/or generates) a first Rx filter according to (e.g., by using) a DCI for scheduling a PDSCH. Then, the communication device receives the PDSCH according to (e.g., via) the first Rx filter. That is, the first Rx filter is determined according to the DCI for scheduling the PDSCH. Thus, the communication device knows how to receive the PDSCH.

Realization of the process 30 is not limited to the above description. The following examples may be applied for realizing the process 30.

In one example, a offset (e.g., a time offset) between a first time instant for receiving the DCI and a second time instant for receiving the PDSCH is less than a threshold. In one example, the threshold is a time period for decoding the DCI, e.g., 7, 14, or 28 orthogonal frequency division multiplexing (OFDM) symbols. That is, the communication device does not (e.g., successfully) decodes the DCI yet, when the communication device receives the PDSCH.

In one example, the DCI is included in a control resource set (CORESET) with the lowest CORESET identity (ID). In one example, the CORESET is in a slot where the communication device is scheduled to receive the PDSCH. In one example, the DCI includes a transmission configuration indicator (TCI) field. In one example, the TCI field indicates a TCI state. In one example, the TCI state indicates a reference signal (RS) corresponding to the Rx filter.

In one example, the communication device receives the PDSCH according to (e.g., via) the first Rx filter while the communication device does not receive the PDSCH according to (e.g., via) a second Rx filter. That is, the communication device does not expect to receive the PDSCH according to another Rx filter which is not the first Rx filter.

In one example, the first Rx filter belongs to a first panel of the communication device, wherein the first panel includes a first plurality of Rx filter which include the first Rx filter. In one example, the second Rx filter belongs to a second panel of the communication device, wherein the second panel includes a second plurality of Rx filter which include the second Rx filter.

Figure 4:
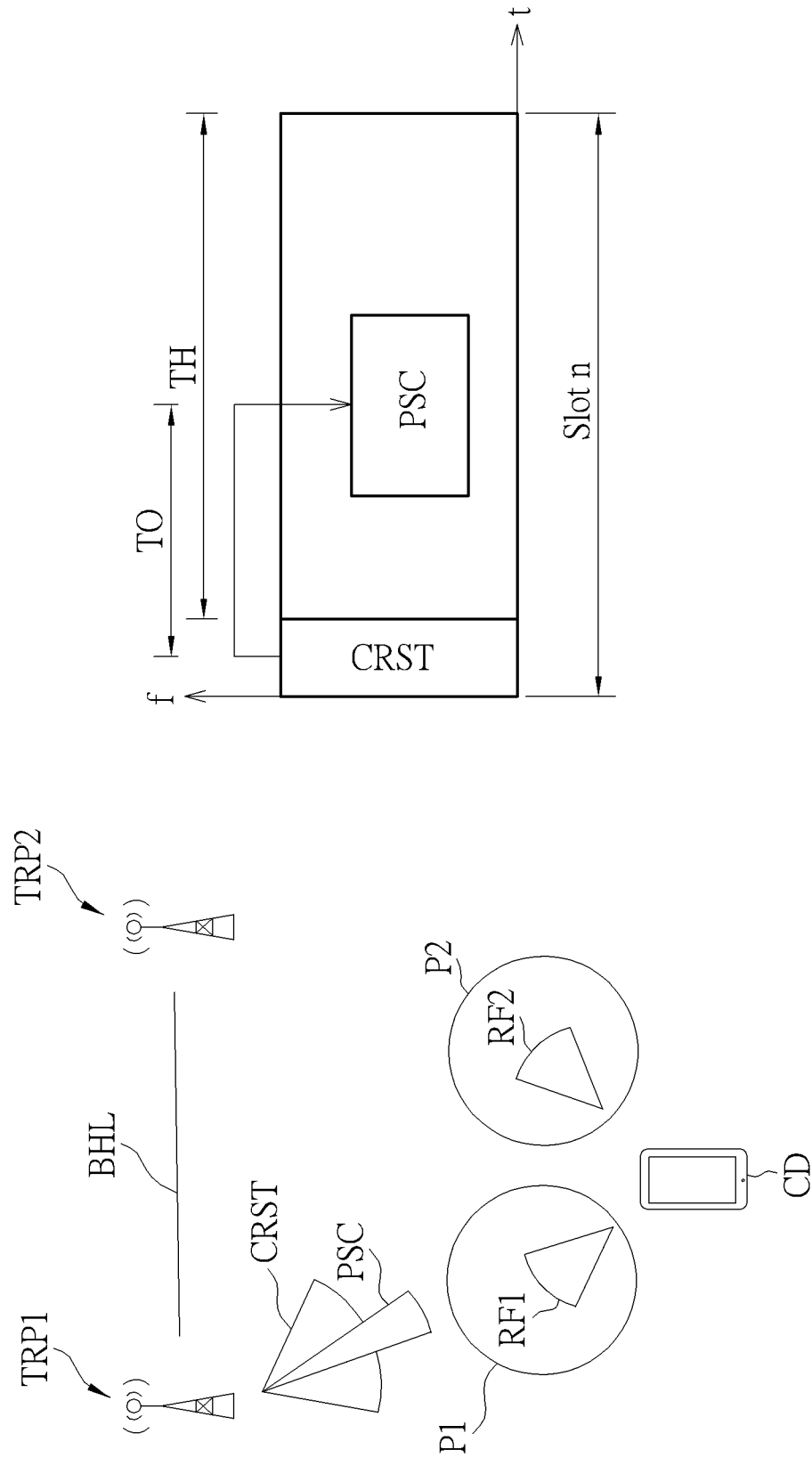
FIG. 4 is a schematic diagram of a communication device according to an example of the present invention.

FIG. 4 is a schematic diagram of reception according to an example of the present invention. Two TRPs TRP1-TRP2 communicate with each other according to (e.g., via) a backhaul BHL, and communicate with a communication device CD according to (e.g., via) a beamforming. The TRP TRP1 transmits a CORESET CRST and a PDSCH PSC to the communication device CD. The communication device CD includes Rx filters RF1-RF2. The Rx filter RF1 belongs to a panel P1 of the communication device CD, and the Rx filter RF2 belongs to a panel P2 of the communication device CD. The communication device CD receives the CORESET CRST from the TRP TRP1 via the Rx filter RF1.

In FIG. 4, X-axis represents a slot n for a time dimension "t" and Y-axis represents a frequency dimension "f", wherein n is a non-negative integer. If a offset TO between time instants for receiving the CORESET CRST and receiving the PDSCH PSC is less than a time period TH for decoding the CORESET CRST, the communication device CD determines (e.g., calculates, obtains, selects and/or generates) the Rx filter RF1 according to the CORESET CRST (e.g., a RS indicated by a TCI state indicated by a TCI field, wherein the TCI field is in a DCI of the CORESET CRST), and receives the PDSCH PSC according to (e.g., via) the Rx filter RF1. The communication device CD does not determine the Rx filter RF2 and does not receive the PDSCH PSC via (e.g., via) the Rx filter RF2.

Figure 5:
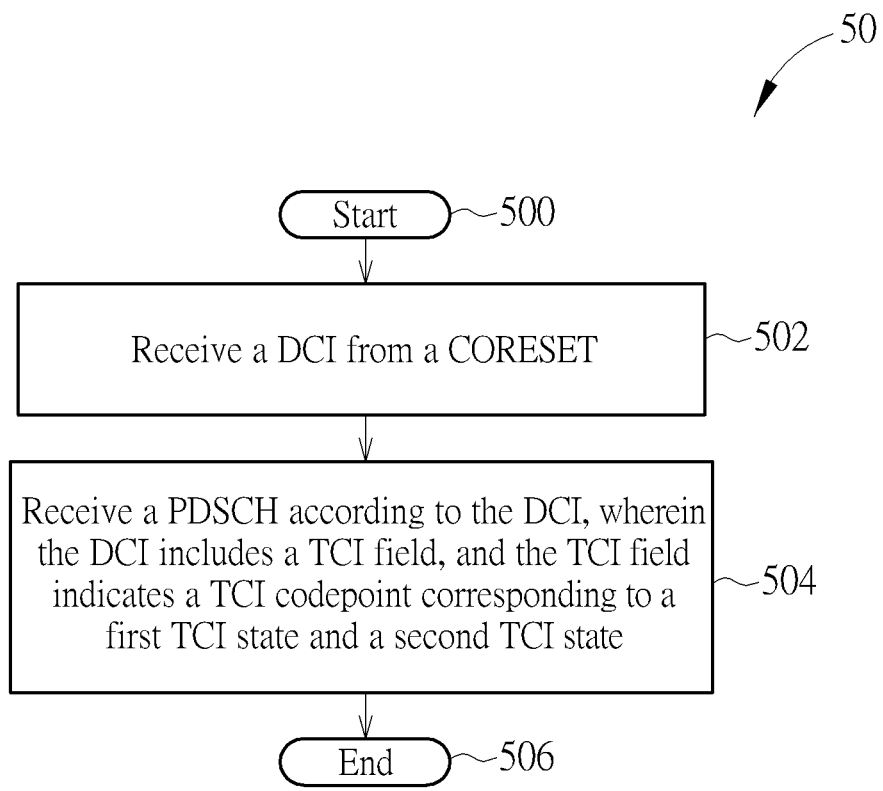
FIG. 5 is a flowchart of a process according to an example of the present invention.

FIG. 5 is a flowchart of a process 50 according to an example of the present invention. The process 50 may be utilized in a communication device (e.g., the communication device shown in FIG. 1), to handle a reception. The process 50 may be compiled into the program codes 214 and includes the following steps:

Step 500: Start.
Step 502: Receive a DCI from a CORESET.
Step 504: Receive a PDSCH according to the DCI, wherein the DCI includes a TCI field, and the TCI field indicates a TCI codepoint corresponding to a first TCI state and a second TCI state.
Step 506: End.

According to the process 50, the communication device receives a DCI from a CORESET (e.g., of a serving cell, which may belong to the TRP TRP1 or the TRP TPR2 in FIG. 1). The communication device receives (e.g., decodes) a PDSCH according to the DCI. The DCI includes a TCI field, and the TCI field indicates a TCI codepoint corresponding to a first TCI state and a second TCI state.

Realization of the process 50 is not limited to the above description. The following examples may be applied for realizing the process 50.

In one example, the communication device determines (e.g., calculates, obtains, selects and/or generates) a first Rx filter according to (e.g., by using) the first TCI state, and receives a first part of the PDSCH (e.g., a first layer group of the PDSCH) according to (e.g., via) the first Rx filter. The communication device determines (e.g., calculates, obtains, selects and/or generates) a second Rx filter according to (e.g., by using) the second TCI state, and receives a second part of the PDSCH (e.g., a second layer group of the PDSCH) according to (e.g., via) the second Rx filter.

In one example, the first TCI state indicates a first RS corresponding to the first Rx filter. In one example, the second TCI state indicates a second RS corresponding to the second Rx filter.

In one example, the first TCI state is corresponding to a first code division multiplexing (CDM) group of at least one first antenna port. In one example, the second TCI state is corresponding to a second CDM group of at least one second antenna port. The at least one first antenna port and the at least one second antenna port may be the same or different. In one example, the first TCI state is corresponding to a CDM group of a plurality of beams. In one example, the second TCI state is corresponding to a second CDM group. In one example, the first CDM group includes a first group of demodulation RS (DM-RS) ports. In one example, the second CDM group includes a second group of DM-RS ports.

In one example, the communication device receives the PDSCH by determining (e.g., assuming) that at least one DM-RS port of the PDSCH is Quasi-CoLocated (QCLed) with at least one RS with respect to at least one QCL parameter (e.g., spatial, time or frequency QCL assumption) associated with a plurality of TCI states, wherein the plurality of TCI states are corresponding to the lowest codepoint among a plurality of TCI codepoints indicating (e.g., containing) at least two different TCI states. In one example, the lowest TCI codepoint is the same as or different from the TCI codepoint described in the process 50. In one example, the plurality of TCI states includes the first TCI state and the second TCI state.

In one example, the communication device may be configured with the plurality of TCI states according to (e.g., via) a higher layer signaling (e.g., a radio resource control (RRC) signaling or a media access control control element (MAC CE) signaling). In one example, the plurality of TCI states are indicated to the communication device according to a fixed, preconfigured or predetermined TCI codepoint (e.g., the lowest TCI codepoint or the highest TCI codepoint of the plurality of TCI codepoints including the TCI codepoint) configured according to (e.g., via) a higher layer signaling (e.g., a RRC signaling or a MAC CE signaling). In one example, the communication device may be configured with correspondences between the TCI field (indicating the TCI codepoints), the plurality of TCI states, the at least one QCL parameter and the corresponding RSs according to (e.g., via) a higher layer signaling.

In one example, the TCI field indicates a N bits information, i.e., the TCI codepoint is a N bits information, wherein N is a positive integer. For example, the TCI field indicates "00", "01", "10" or "11", i.e., the TCI codepoint is "00", "01", "10" or "11", when N=2.

In one example, a offset (e.g., a time offset) between a first time instant for receiving the DCI and a second time instant for receiving the first PDSCH or the second PDSCH is less than a threshold. In one example, the offset is indicated according to (e.g., by using) the DCI. In one example, the threshold is configured according to (e.g., via) a higher layer signaling, e.g., a RRC signaling or a MAC CE signaling. In one example, the threshold is a time period for decoding the DCI. In one example, the threshold includes (e.g., is) at least one OFDM symbols, e.g., 7, 14, or 28 OFDM symbols.

In one example, the CORESET is configured according to (e.g., via) a higher layer signaling, e.g., a RRC signaling or a MAC CE signaling.

In one example, the TCI field is predetermined, fixed or preconfigured. In one example, the TCI field is configured according to (e.g., by using) a higher layer signaling, e.g., a RRC signaling or a MAC CE signaling.

In one example, the first TCI state includes (e.g., indicates) at least one of a first RS (e.g., for a spatial QCL assumption) and a second RS (e.g., for a time/frequency QCL assumption), and the second TCI state includes (e.g., indicates) at least one of a third RS (e.g., for the spatial QCL assumption) and a fourth RS (e.g., for the time/frequency QCL assumption). In one example, the RS(s) mentioned above is configured according to (e.g., by using) a higher layer a higher layer signaling, e.g., a RRC signaling or a MAC CE signaling. In one example, the QCL assumption refers to a QCL relation, a QCL type or a QCL information.

In one example, the first TCI state (or the second TCI state) is corresponding (e.g., 1 to 1 mapping) to at least one layer group (e.g., at least one code division multiplexing (CDM) group) in demodulation RS (DM-RS) ports of the first PDSCH (or the second TCI state). In one example, the first TCI state (or the second TCI state) is corresponding to at least one codeword in the first PDSCH (or the second PDSCH). In one example, the first TCI state (or the second TCI state) is corresponding to at least one panel of the communication device. In one example, each of the at least one panel of the communication device includes at least one antenna port.

In one example, the first TCI state (or the second TCI state) includes at least one parameter for configuring a QCL relation between at least one RS and the at least one DM-RS port of the first PDSCH (or the second PDSCH), at least one DM-RS port of a first physical DL control channel (PDCCH) corresponding to the first PDSCH (or a second PDCCH corresponding to the second PDSCH), or channel state information-RS (CSI-RS) ports of a CSI-RS resource.

In one example, the first TCI state includes at least one first QCL information. In one example, the second TCI state includes at least one second QCL information. In one example, the at least one first QCL information includes at least one of a RS and a QCL-type. In one example, the QCL-type includes at least one of a time parameter (or information), a frequency parameter (or information) and a spatial Rx parameter (or information).

FIG. 6 is a schematic diagram of a TCI field-TCI state mapping table 60 according to an example of the present invention, wherein corresponding RSs are also shown. A communication device may be configured with correspondences between a TCI field (indicating TCI codepoints), TCI states, QCL parameter(s) and corresponding RSs (e.g., correspondence in the mapping table 60) according to (e.g., via) a higher layer signaling. The TCI field may indicate 2 bits information such as "00", "01", "10" and/or "11", i.e., the TCI codepoints are "00", "01", "10" and/or "11". In one example, the lowest TCI codepoint is predetermined according to (e.g., via) the higher layer signaling. If a offset between a first time instant for receiving the DCI and a second time instant for receiving the PDSCH is less than a threshold for decoding the DCI, the communication device receives the PDSCH by determining (e.g., assuming) that at least one DM-RS port of the PDSCH are QCLed with a RS "A0" and/or a RS "C0" with respect to the spatial QCL assumption associated with the first TCI state corresponding to the lowest codepoint "00" among the TCI codepoints indicating two different TCI states, and are QCLed with a RS "B0" and/or a RS "D0" with respect to the time/frequency QCL assumption associated with the second TCI state corresponding to the lowest codepoint "00" among the TCI codepoints indicating two different TCI states.

In another example, the highest TCI codepoint is predetermined according to (e.g., via) the higher layer signaling. If the offset between is less than the threshold, the communication device receives the PDSCH by determining (e.g., assuming) that at least one DM-RS port of the PDSCH are QCLed with a RS "A2" and/or a RS "C2" with respect to the spatial QCL assumption associated with the first TCI state corresponding to the highest codepoint "10" among the TCI codepoints indicating two different TCI states, and are QCLed with a RS "B2" and/or a RS "D2" with respect to the time/frequency QCL assumption associated with the second TCI state corresponding to the highest codepoint "10" among the TCI codepoints indicating two different TCI states. That is, the communication device may assume that the at least one DM-RS port of the PDSCH are QCLed with the at least one RS with respect to the QCL parameter(s) associated with the first state and second TCI state corresponding to the highest codepoint of the TCI codepoints indicating two different TCI states.

Figure 7:
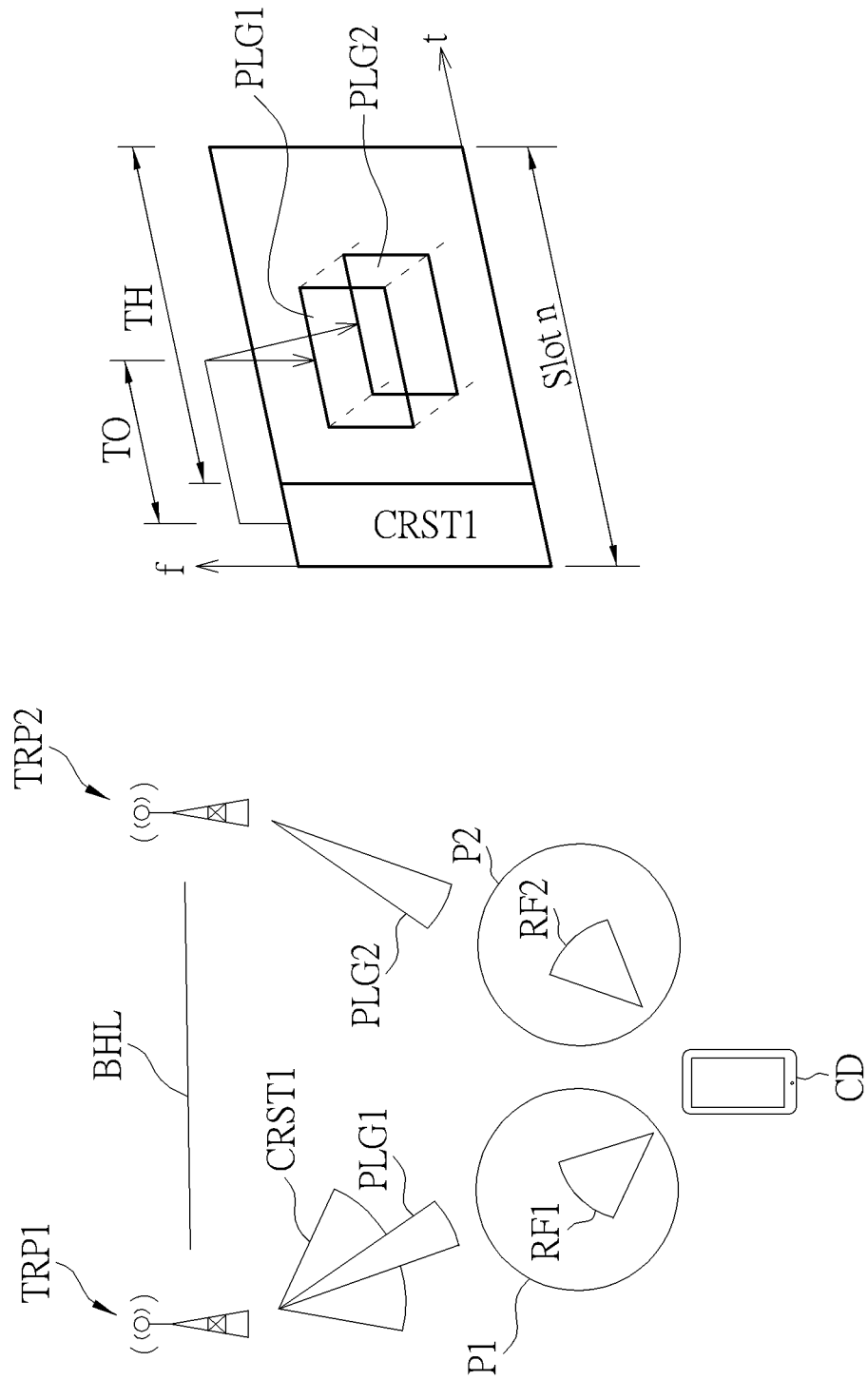
FIG. 7 is a schematic diagram of reception according to an example of the present invention.

FIG. 7 is a schematic diagram of reception according to an example of the present invention. FIG. 7 may be an example of FIG. 6. Two TRPs TRP1-TRP2 communicate with each other according to (e.g., via) a backhaul BHL. The TRP TRP1 transmits a CORESET CRST1 and a PDSCH layer group PLG1 to a communication device CD, and the TRP TRP2 transmits a PDSCH layer group PLG2 to the communication device CD. The communication device CD includes Rx filters RF1-RF2. The Rx filter RF1 belongs to a panel P1 of the communication device CD, and the Rx filter RF2 belongs to a panel P2 of the communication device CD. The communication device CD is configured with correspondences between a TCI field (indicating TCI codepoints), TCI states, QCL parameter(s) and corresponding RSs according to the higher layer signaling. The communication device CD receives the CORESET CRST1 for scheduling the PDSCH layer groups PLG1 and PLG2 from the TRP TRP1 via the Rx filter RF1.

In FIG. 7, X-axis represents a slot n for a time dimension "t" and Y-axis represents a frequency dimension "f", wherein n is a non-negative integer. If a offset TO between time instants for receiving the CORESET CRST1 and receiving the PDSCH layer groups PLG1 and PLG2 (e.g., the PDSCH layer groups PLG1 and PLG2 are received at the same time, the same frequency and on different spatial domains) is less than a threshold TH for decoding the CORESET CRST1, the communication CD device receives the PDSCH layer group PLG1 by determining (e.g., assuming) that at least one DM-RS port of the PDSCH layer group PLG1 is QCLed with a RS "A0" with respect to a spatial QCL assumption associated with the first TCI state corresponding to the lowest codepoint "C0" of the TCI codepoints. Then, the communication CD device receives the PDSCH layer group PLG1 according to the Rx filter RF1 corresponding to the RS "A0". The communication CD device receives the PDSCH layer group PLG2 by determining (e.g., assuming) that at least one DM-RS port of the PDSCH layer group PLG2 is QCLed with a RS "C0" with respect to the spatial QCL assumption associated with the second TCI state corresponding to the lowest codepoint "C0" of the TCI codepoints. Then, the communication CD device receives the PDSCH layer group PLG2 according to the Rx filter RF2 corresponding to the RS "C0".

In one example, the first TCI state is determined according to (e.g., a first DCI in) a CORESET with the lowest CORESET ID in a slot. In one example, the first DCI (or the CORESET) is in the latest slot (e.g., from the slot the communication device is scheduled to receive the first PDSCH) in which at least one CORESET are monitored by the communication device. In one example, a offset between a first time instant for receiving the first DCI and a second time instant for receiving the first PDSCH is less than a threshold. In one example, the threshold is a time period for decoding the first DCI, e.g., 7, 14, or 28 OFDM symbols. In one example, the second TCI state is determined according to a TCI field. In one example, the TCI field is in a second DCI. In one example, the second DCI is for scheduling the second PDSCH. In one example, a offset between a third time instant for receiving the second DCI and a fourth time instant for receiving the second PDSCH is less than a threshold. In one example, the threshold is a time period for decoding the second DCI, e.g., 7, 14, or 28 OFDM symbols. In one example, the TCI field is configured according to (e.g., via) a higher layer signaling, e.g., a RRC signaling or a MAC CE signaling.

Figure 8:
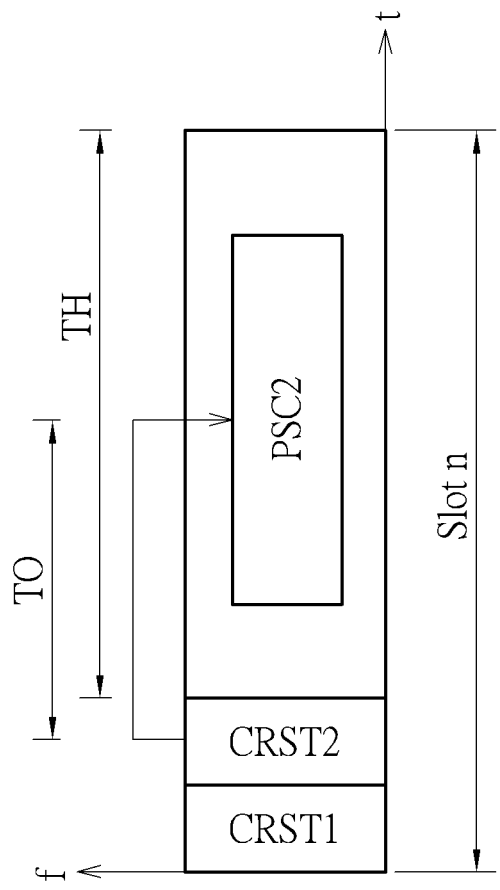
FIG. 8 is a schematic diagram of reception according to an example of the present invention.
Figure 8:
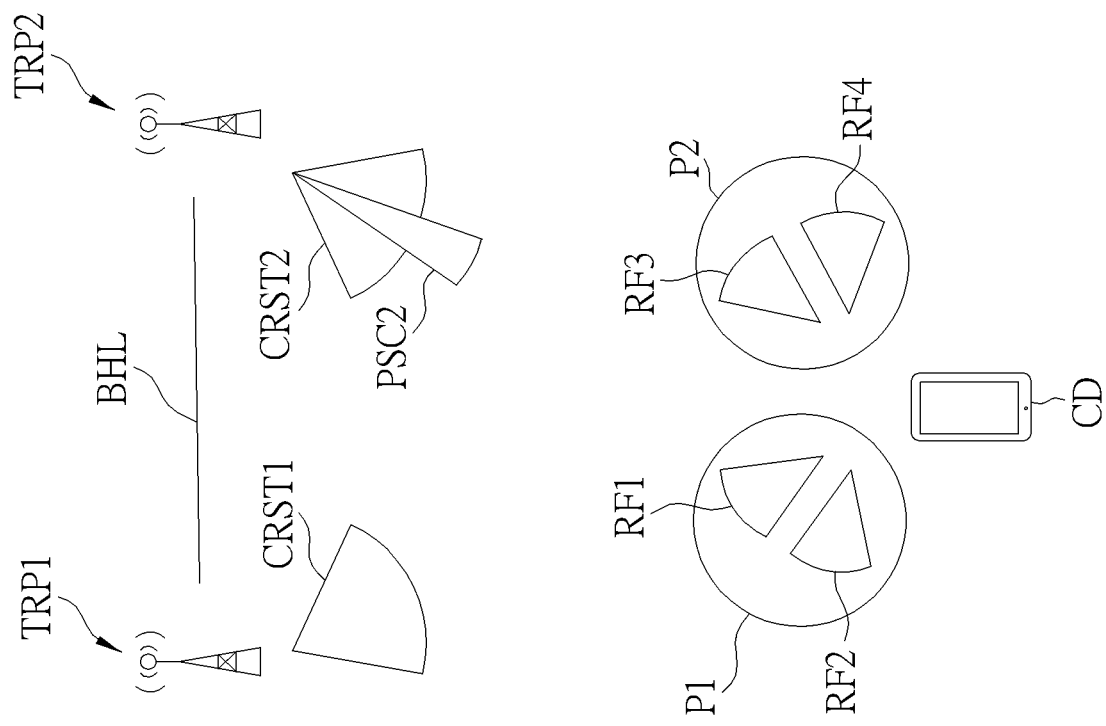

FIG. 8 is a schematic diagram of reception according to an example of the present invention. FIG. 8 may be an example of FIG. 6. Two TRPs TRP1-TRP2 communicate with each other according to (e.g., via) a backhaul BHL. The TRP TRP1 transmits a CORESET CRST1 to a communication device CD, and the TRP TRP2 transmits a CORESET CRST2 and a PDSCH PSC2 to the communication device CD. The communication device CD includes Rx filters RF1-RF4. The Rx filters RF1 and RF3 belong to a panel P1 of the communication device CD, and the Rx filters RF2 and RF4 belong to a panel P2 of the communication device CD. The communication device CD is configured with correspondences between a TCI field (indicating TCI codepoints), TCI states, QCL parameter(s) and corresponding RSs according to the higher layer signaling. The communication device CD receives the CORESET CRST1 from the TRP TRP1, and receives the CORESET CRST2 for scheduling the PDSCH PSC2 from the TRP TRP2.

In FIG. 8, X-axis represents a slot n for a time dimension "t" and Y-axis represents a frequency dimension "f", wherein n is a non-negative integer. In one example, the communication device CD determines the Rx filter RF1 according to a CORESET with the lowest CORESET ID in a slot n, i.e., the CORESET CRST1, and receives the CORESET CRST1 according to the Rx filter RF1. If a offset TO between time instants for receiving the CORESET CRST2 and receiving the PDSCH PSC2 is less than a threshold TH for decoding the CORESET CRST2, the communication device CD determines the Rx filter RF3 according to a CORESET for scheduling the PDSCH PSC2, i.e., the CORESET CRST2 (e.g., a TCI state indicated by the lowest TCI codepoint in a TCI field. If the TCI codepoint of the TCI field indicates more than one TCI states, the communication device CD may assume that at least one DM-RS port of the PDSCH PSC2 are QCLed with at least one RS in one of the TCI states with the lowest, the highest or a pre-defined TCI state ID, and receives the PDSCH PSC2 according to the Rx filter RF3.

Figure 9:
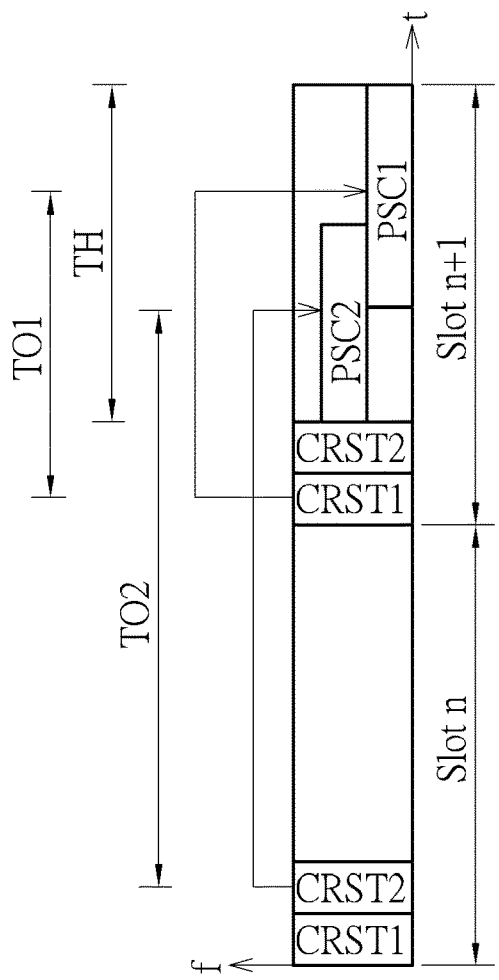
FIG. 9 is a schematic diagram of reception according to an example of the present invention.
Figure 9:
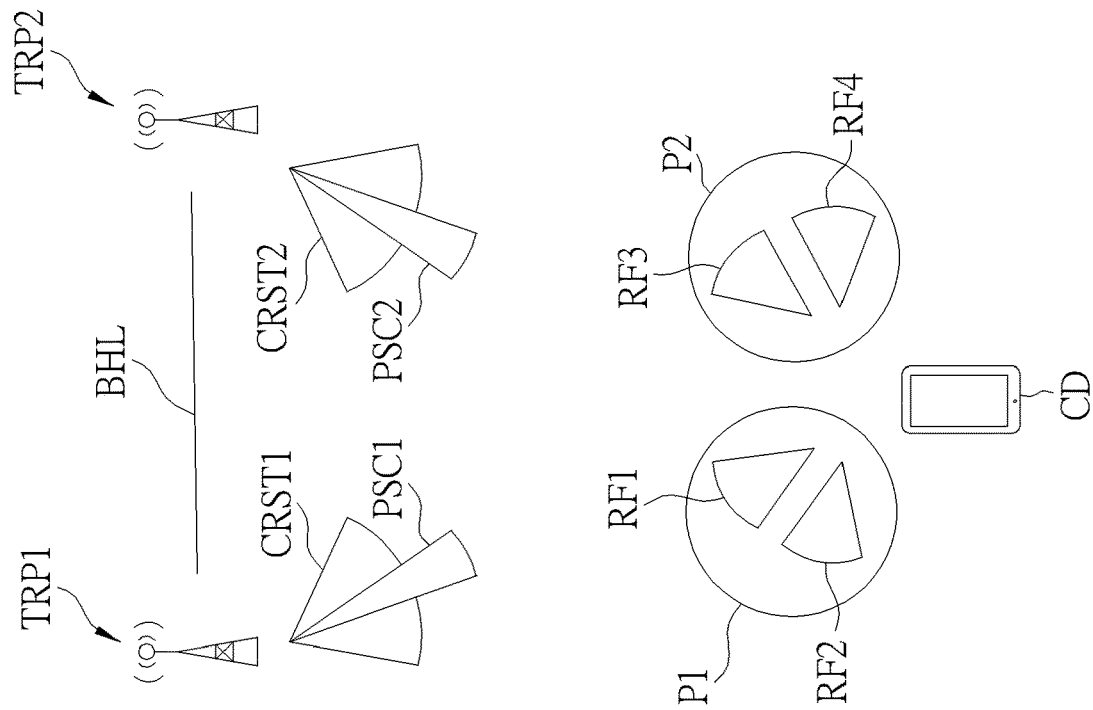

FIG. 9 is a schematic diagram of reception according to an example of the present invention. Two TRPs TRP1-TRP2 communicate with each other according to (e.g., via) a backhaul BHL. The TRP TRP1 transmits a CORESET CRST1 and a PDSCH PSC1 to a communication device CD, and the TRP TRP2 transmits a CORESET CRST2 and a PDSCH PSC2 to the communication device CD. The communication device CD includes Rx filters RF1-RF4. The Rx filters RF1 and RF3 belong to a panel P1 of the communication device CD, and the Rx filters RF2 and RF4 belong to a panel P2 of the communication device CD. The communication device CD receives the CORESET CRST1 for scheduling the PDSCH PSC1 from the TRP TRP1, and receives the CORESET CRST2 for scheduling the PDSCH PSC2 from the TRP TRP2.

In FIG. 9, X-axis represents a slot n and a slot (n+1) for a time dimension "t" and Y-axis represents a frequency dimension "f", wherein n is a non-negative integer. If a offset TO1 between time instants for receiving the CORESET CRST1 and receiving the PDSCH PSC1 is less than a threshold TH for decoding the CORESET CRST1 and a offset TO2 between time instants for receiving the CORESET CRST2 and receiving the PDSCH PSC2 is greater than the threshold TH for decoding the CORESET CRST2, the communication device CD determines the Rx filter RF1 according to a CORESET with the lowest CORESET ID in the slot n, i.e., the CORESET CRST1 and receives the CORESET CRST1 according to the Rx filter RF1. In addition, the communication device CD determines the Rx filter RF3 according to a CORESET for scheduling the PDSCH PSC2, i.e., the CORESET CRST2 (e.g., a TCI state indicated by the lowest N bits information in a TCI field. If the TCI codepoint of the TCI field indicates more than one TCI states, the communication device may assume that the at least one DM-RS port of the PDSCH are QCLed with at least one RS in one of the TCI states with the lowest, the highest or a pre-defined TCI state ID, and receives the PDSCH PSC2 according to the Rx filter RF3.

In one example, the second TCI state is determined according to a plurality of TCI states. In one example, the plurality of TCI states include the first TCI state and the second TCI state. In one example, the plurality of TCI states are configured according to (e.g., via) a higher layer signaling, e.g., a RRC signaling or a MAC CE signaling. In one example, the second TCI state is determined (e.g., selected) differently from the first TCI state, when a first plurality of Rx filters (e.g., a first panel of the communication device) to which the first Rx filter belongs is different from a second plurality of Rx filters (e.g., a second panel of the communication device) to which the second Rx filter belongs. That is, the first Rx filter and the second Rx filter belong to different plurality of Rx filters (e.g., different panels).

In one example, a first RS indicated by the first TCI state and a second RS indicated by the second TCI state are received simultaneously according to (e.g., via) a single spatial domain Rx filter, a plurality of simultaneous Rx filters (e.g., Rx filters), or different panels.

Figure 10:
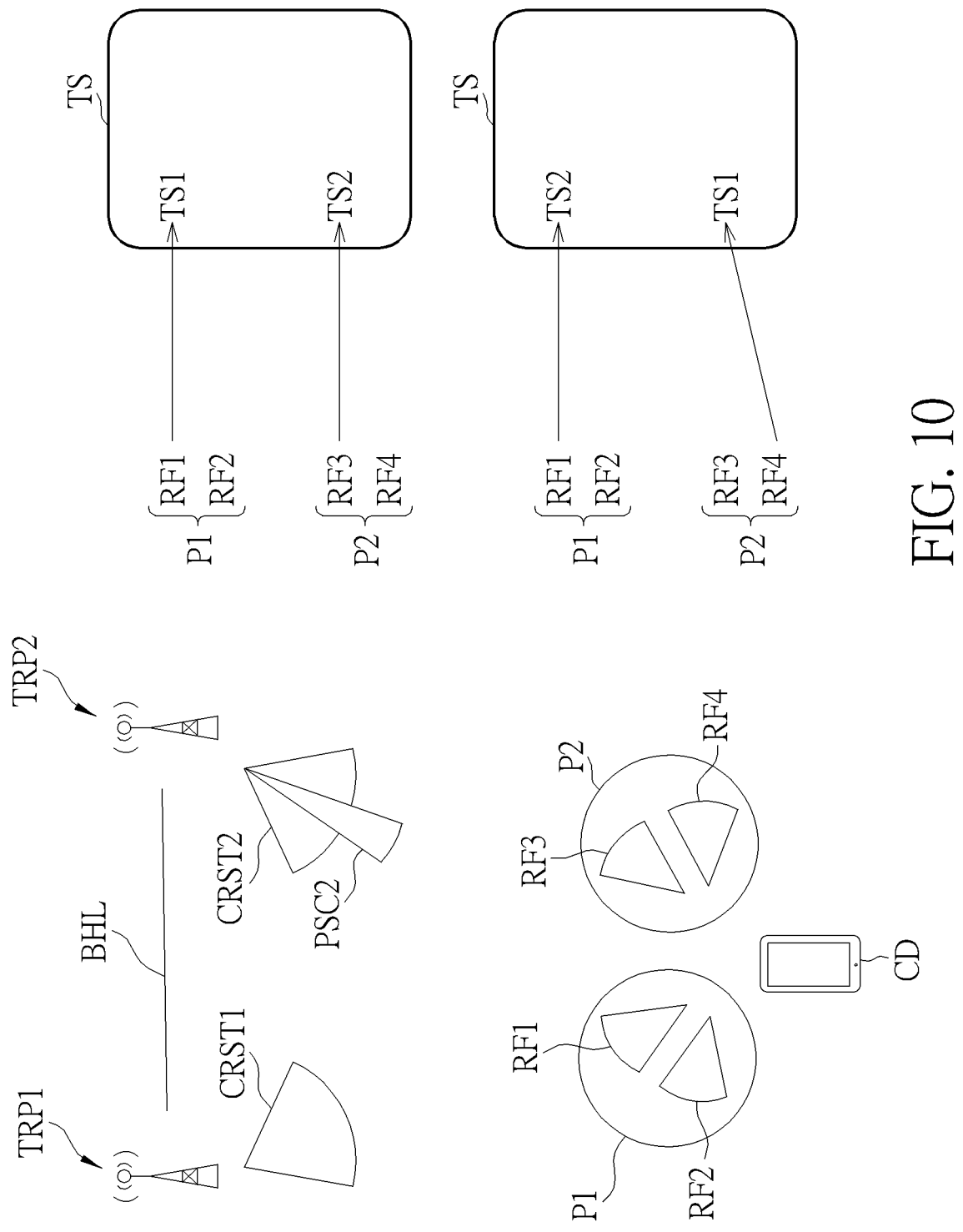
FIG. 10 is a schematic diagram of reception according to an example of the present invention.

FIG. 10 is a schematic diagram of reception according to an example of the present invention. Two TRPs TRP1-TRP2 communicate with each other according to (e.g., via) a backhaul BHL. The TRP TRP1 transmits a CORESET CRST1 to a communication device CD, and the TRP TRP2 transmits a CORESET CRST2 and a PDSCH PSC2 to the communication device CD. The communication device CD includes Rx filters RF1-RF4. The Rx filters RF1 and RF3 belong to a panel P1 of the communication device CD, and the Rx filters RF2 and RF4 belong to a panel P2 of the communication device CD. The communication device CD is configured with a plurality of TCI states TS including at least a first TCI state TS1 and a second TCI state TS2. Similar to the scenario of FIG. 8, a offset between time instants for receiving the CORESET CRST2 and receiving the PDSCH PSC2 is less than the threshold for decoding the CORESET CRST2.

In FIG. 10, similar to FIG. 8, the communication device CD determines the Rx filter RF1 according to a CORESET with the lowest CORESET ID in the slot n (e.g., the CORESET CRST1, and the first TCI state TS1 is indicated in the CORESET CRST1), and receives the CORESET CRST1 according to the Rx filter RF1. In addition, the communication device CD determines the Rx filter RF3 according to the second TCI state TS2, and receives the PDSCH PSC2 according to the Rx filter RF3. The second TCI state TS2 is determined (e.g., selected) from the plurality of TCI states TS and is determined (e.g., selected) differently from the first TCI state TS1, when the panel P1 to which the Rx filter RF1 belongs is different from the panel P2 to which the Rx filter RF3 belongs.

In FIG. 10, similar to FIG. 8, the communication device CD determines the Rx filter RF4 according to a CORESET with the lowest CORESET ID in the slot n (e.g., the CORESET CRST1 and the first TCI state TS1 is indicated in the CORESET CRST1), and receives the CORESET CRST1 according to the Rx filter RF4. In addition, the communication device CD determines the Rx filter RF1 according to the second TCI state TS2, and receives the PDSCH PSC2 according to the Rx filter RF1. The second TCI state TS2 is determined (e.g., selected) from the plurality of TCI states TS and is determined (e.g., selected) differently from the first TCI state TS1, when the panel P2 to which the Rx filter RF4 belongs is different from the panel P1 to which the Rx filter RF1 belongs.

In one example, the first TCI state and the second TCI state are configured in a CORESET, e.g., a CORESET with the lowest CORESET ID. In one example, the communication device determines a first Rx filter corresponding to (e.g., a RS of) the first TCI state, and receives at least one CORESET (e.g., the CORESET) according to (e.g., via) the first Rx filter. In one example, the communication device determines a second Rx filter corresponding to (e.g., a RS of) the second TCI state, and receives at least one PDSCH according to (e.g., via) the second Rx filter.

In one example, the communication device receives an indicator, and determines whether the second TCI state is activated or presented according to the indicator. For example, the communication device determines that the second TCI state is activated or presented in the CORESET, if the indicator indicating "1". For example, the communication device determines that the second TCI state is deactivated or presented in the CORESET, if the indicator indicating "0".

FIG. 11 is a schematic diagram of a schematic diagram of a CORESET-TCI state mapping table 110 according to an example of the present invention. FIG. 11 follows the scenario of FIG. 8. In one example, if a communication device is configured with a CORESET CRST with the lowest CORESET ID, i.e., "CRST1", a first TCI state is corresponding to a TCI state "A0" (e.g., for a spatial QCL assumption), and a second TCI state is corresponding to a TCI state "C0" (e.g., for the spatial QCL assumption). Then, the communication device determines (e.g., to use) a first Rx filter corresponding to (e.g., a RS of) the TCI state "A0", and receives the CORESET CRST1 and/or the CORESET CRST2 according to (e.g., via) the first Rx filter. The communication device determines (e.g., to use) a second Rx filter corresponding to (e.g., a RS of) the TCI state "C0", and receives the PDSCH PSC2 according to (e.g., via) the second Rx filter.

Figure 12:
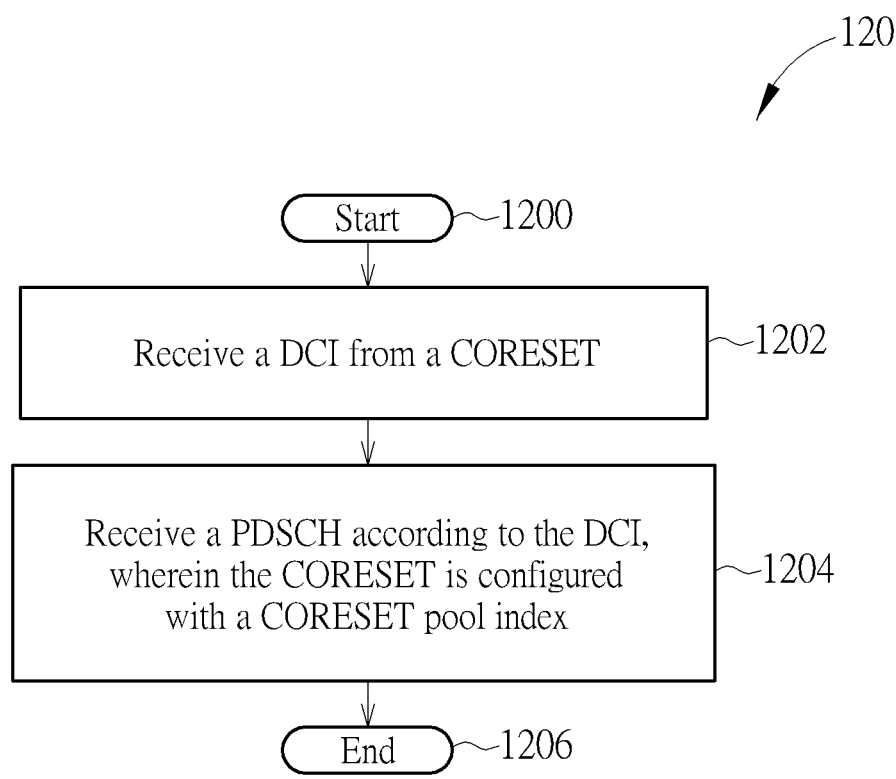
FIG. 12 is a flowchart of a process according to an example of the present invention.

FIG. 12 is a flowchart of a process 120 according to an example of the present invention. The process 120 may be utilized in a communication device (e.g., the communication device shown in FIG. 1), to handle a reception. The process 120 may be compiled into the program codes 214 and includes the following steps:

Step 1200: Start.
Step 1202: Receive a DCI from a CORESET.
Step 1204: Receive a PDSCH according to the DCI, wherein the CORESET is configured with a CORESET pool index.
Step 1206: End.

According to the process 120, the communication device receives a DCI from a CORESET (e.g., of a serving cell, which may belong to the TRP TRP1 or the TRP TPR2 in FIG. 1). The communication device receives (e.g., decodes) a PDSCH according to the DCI. The CORESET is configured with a CORESET pool index.

Realization of the process 120 is not limited to the above description. The following examples may be applied for realizing the process 120.

In one example, the communication device determines (e.g., calculates, obtains, selects and/or generates) a Rx filter according to the CORESET pool index, and receives the PDSCH according to (e.g., via) the Rx filter.

In one example, the communication device receives the PDSCH by determining (e.g., assuming) that at least one DM-RS port of the PDSCH is QCLed with at least one RS with respect to at least one QCL parameter (e.g., spatial, time or frequency QCL assumption) used for physical DL control channel (PDCCH) QCL indication of a CORESET with the lowest CORESET ID among at least one CORESET, wherein the at least one CORESET is configured with the same value of another CORESET pool index. The another CORESET pool index and the CORESET pool index described in the process 120 may be the same or different.

In one example, the DCI (or the CORESET) is in the latest slot (e.g., from the slot the communication device is scheduled to receive the PDSCH) in which the at least one CORESET are monitored by the communication device.

In one example, the CORESET with the lowest CORESET ID is the same as or different from different from the CORESET configured with the CORESET pool index described in the process 120.

In one example, the CORESET pool index is associated with at least one of a Rx filter, a TRP, a PDCCH configuration, a scrambling ID and a cell. For example, the CORESET group configured with the CORESET pool index is transmitted from the associated TRP. In one example, the CORESET pool index indicates a CORESET group. In one example, the CORESET group includes at least one CORESET.

In one example, a offset (e.g., a time offset) between a first time instant for receiving the DCI and a second time instant for receiving the PDSCH is less than a threshold. In one example, the offset is indicated according to (e.g., by using) the DCI. In one example, the threshold is configured according to (e.g., via) a higher layer signaling, e.g., a RRC signaling or a MAC CE signaling. In one example, the threshold is a time period for decoding the DCI. In one example, the threshold includes (e.g., is) at least one OFDM symbol, e.g., 7, 14, or 28 OFDM symbols.

In one example, the CORESET is configured according to (e.g., via) a higher layer signaling, e.g., a RRC signaling or a MAC CE signaling.

Figure 13:
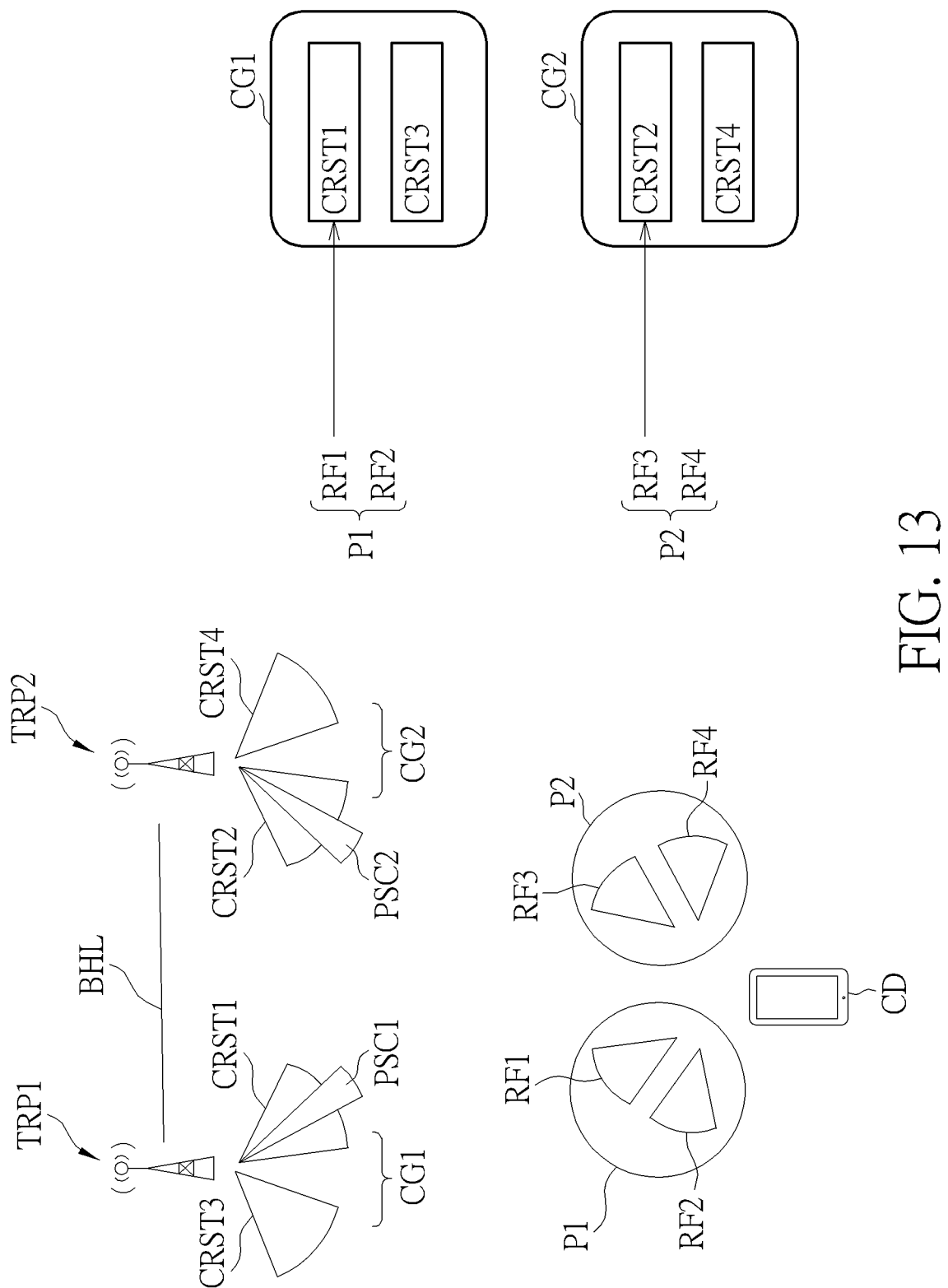
FIG. 13 is a schematic diagram of reception according to an example of the present invention.

FIG. 13 is a schematic diagram of reception according to an example of the present invention. Two TRPs TRP1-TRP2 communicate with each other according to (e.g., via) a backhaul BHL. The communication device CD includes Rx filters RF1-RF4. The Rx filters RF1 and RF2 belong to a panel P1 of the communication device CD, and the Rx filters RF3 and RF4 belong to a panel P2 of the communication device CD. The communication device CD receives (e.g., is configured with) CORESETs CRST1, CRST2, CRST3 and CRST4. The CORESET CRST2 and CRST4 are configured with the same value of a CORESET pool index, i.e., "CG2". The CORESET CRST1 and CRST3 are configured with the same value of a CORESET pool index, i.e., "CG1". Similar to the scenario of FIG. 8, a offset TO between time instants for receiving the CORESET CRST2 and receiving a PDSCH PSC2 is less than a threshold TH for decoding the CORESET CRST2, or similar to the scenario of FIG. 9, a offset TO1 between time instants for receiving the CORESET CRST1 and receiving a PDSCH PSC1 is less than a threshold TH for decoding the CORESET CRST1 and a offset TO2 between time instants for receiving the CORESET CRST2 and receiving the PDSCH PSC2 is greater than the threshold TH for decoding the CORESET CRST2.

In FIG. 13, the communication device CD receives a DCI from the CORESET CRST2, and receives the PDSCH PSC2 according to the DCI. The communication device CD receives the PDSCH PSC2 by determining (e.g., assuming) that at least one DM-RS port of the PDSCH PSC2 are QCLed with at least one RS with respect to QCL parameter(s) used for PDCCH QCL indication of a CORESET with the lowest CORESET ID (e.g., CORESET CRST2) among at least one CORESET (e.g., the CORESETs CRST2 and CRST4), wherein the at least one CORESET are configured with the same value of the CORESET pool index (e.g., "CG2"). Then, the communication device CD may receive the PDSCH PSC2 according to (e.g., via) the Rx filter RF3 corresponding to the CORESET pool index, i.e., "CG2". In addition, the communication device CD receives the PDSCH PSC1 by determining (e.g., assuming) that at least one DM-RS port of the PDSCH PSC1 are QCLed with at least one RS with respect to QCL parameter(s) used for PDCCH QCL indication of a CORESET with the lowest CORESET ID (e.g., CORESET CRST1) among at least one CORESET (e.g., the CORESETs CRST1 and CRST3), wherein the at least one CORESET are configured with the same value of the CORESET pool index (e.g., "CG1"). Then, the communication device CD may receive the PDSCH PSC1 according to (e.g., via) the Rx filter RF1 corresponding to the CORESET pool index, i.e., "CG1".

Figure 14:
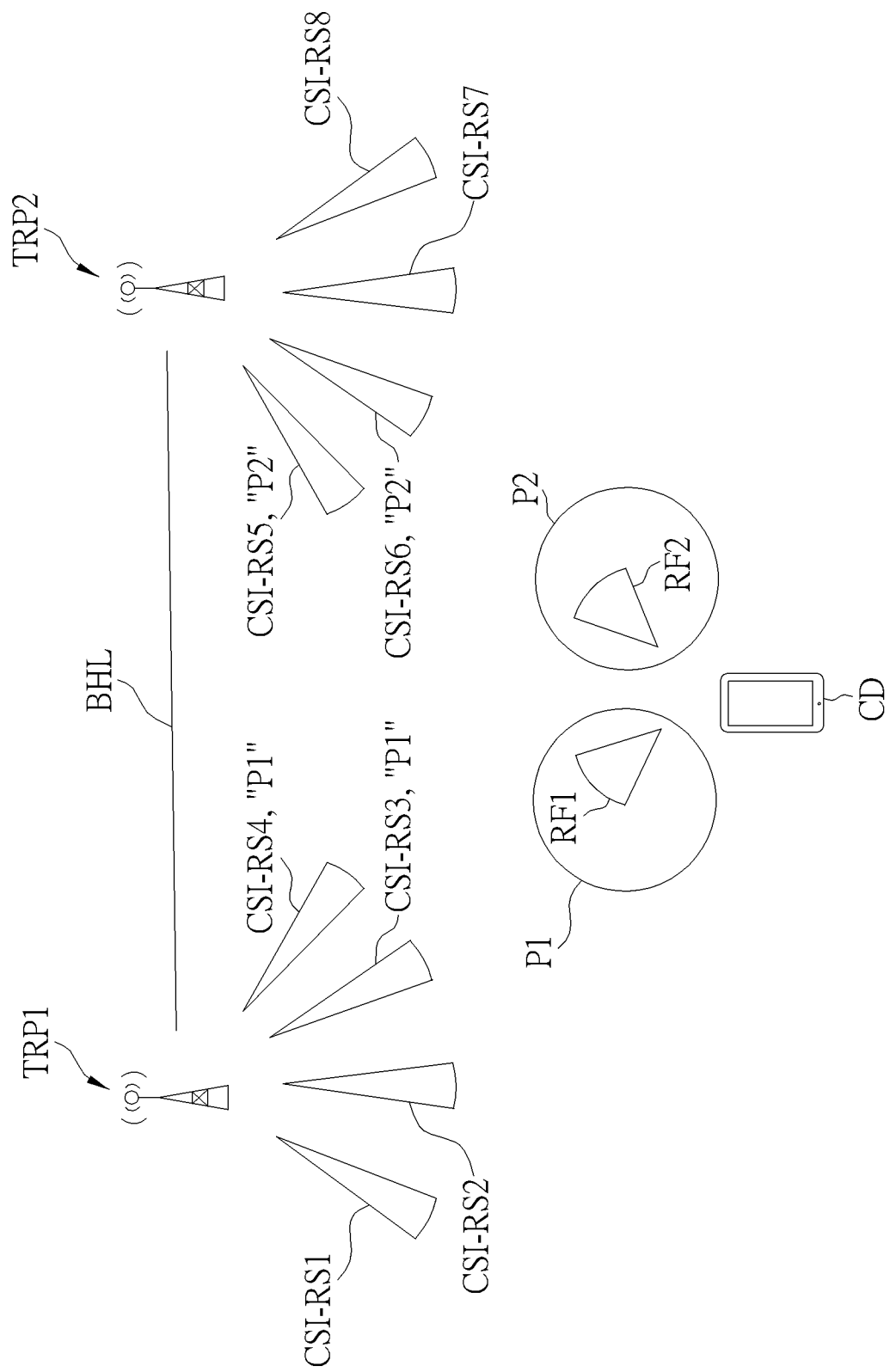
FIG. 14 is a schematic diagram of a reporting before a reception according to an example of the present invention.

FIG. 14 is a schematic diagram of a reporting before a reception according to an example of the present invention. Two TRPs TRP1-TRP2 communicate with each other according to (e.g., via) a backhaul BHL. The TRP TRP1 transmits (e.g., beamforms) CSI-RSs CSI-RS1-CSI-RS14 to a communication device CD, and the TRP TRP2 transmits (e.g., beamforms) CSI-RSs CSI-RS5-CSI-RS8 to the communication device CD. The communication device CD includes Rx filters RF1-RF2. The Rx filter RF1 belongs to a panel P1 of the communication device CD, and the Rx filter RF2 belongs to a panel P2 of the communication device CD. The communication device CD measures the CSI-RSs CSI-RS1-CSI-RS4 according to (e.g., by using) the Rx filter RF1, and measures the CSI-RSs CSI-RS5-CSI-RS8 according to (e.g., by using) the Rx filter RF2. Then, the communication device CD reports the CSI-RS CSI-RS3 with a panel index of the panel P1 (e.g., "P1") and the CSI-RS CSI-RS4 with "P1" to the TRP TRP1, and reports the CSI-RS CSI-RS5 with a panel index of the panel P2 (e.g., "P2") and the CSI-RS CSI-RS6 with "P2" to the TRP TRP2. Accordingly, the TRP TRP1 obtains that the CSI-RSs CSI-RS3 and CSI-RS4 are received via the same panel and cannot be received simultaneously. The TRP TRP2 obtains that the CSI-RSs CSI-RS5 and CSI-RS6 are received via the same panel and cannot be received simultaneously.

Figure 15:
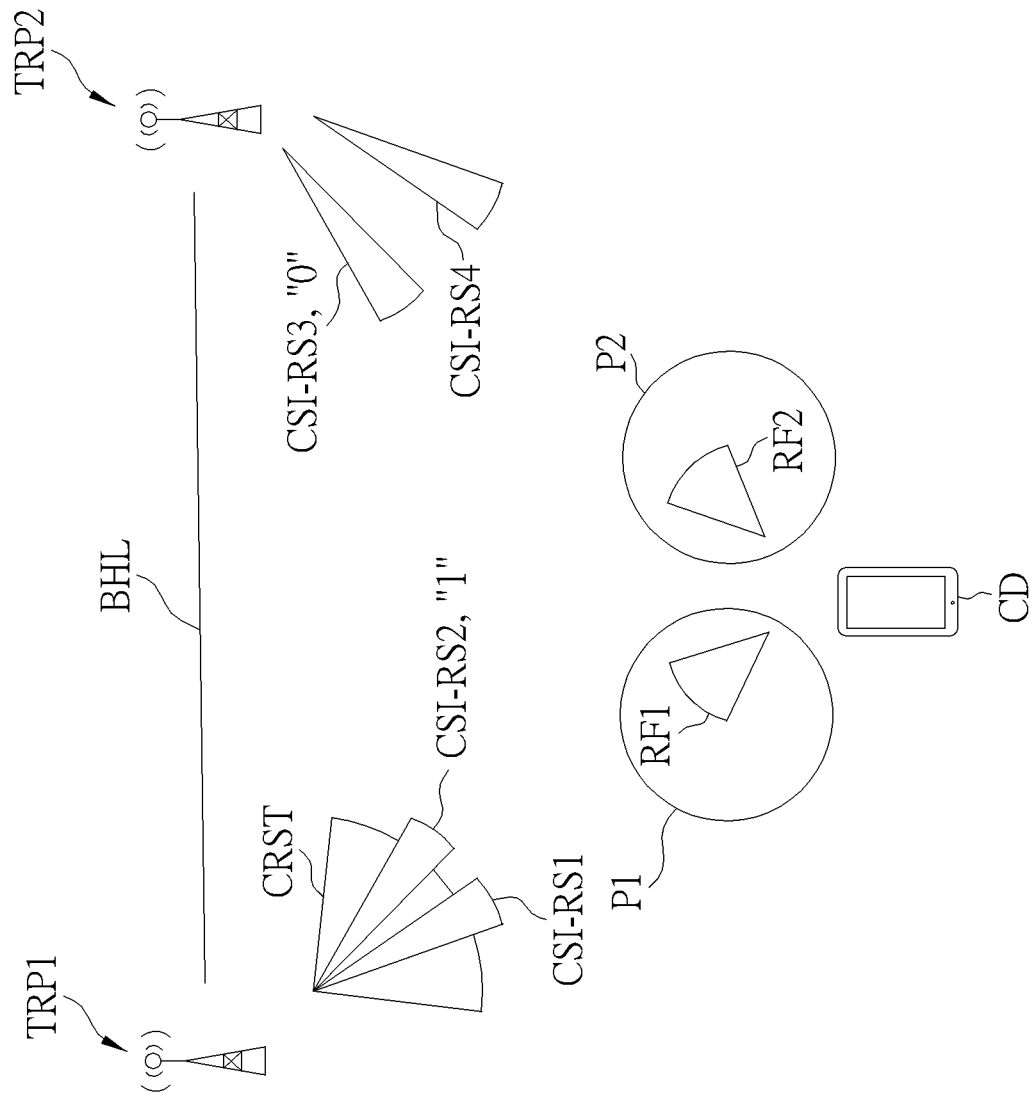
FIG. 15 is a schematic diagram of a reporting before a reception according to an example of the present invention.

FIG. 15 is a schematic diagram of a reporting before a reception according to an example of the present invention. Two TRPs TRP1-TRP2 communicate with each other according to (e.g., via) a backhaul BHL. The TRP TRP1 transmits (e.g., beamforms) a CORESET CRST and CSI-RSs CSI-RS1 and CSI-RS2 to a communication device CD. The TRP TRP2 transmits (e.g., beamforms) CSI-RSs CSI-RS3 and CSI-RS4 to the communication device CD. The communication device CD includes Rx filters RF1-RF2. The communication device CD measures the CSI-RSs CSI-RS1 and CSI-RS2 according to (e.g., by using) the Rx filter RF1, and measures the CSI-RSs CSI-RS3 and CSI-RS4 according to according to (e.g., by using) the Rx filter RF2. Then, the communication device CD reports the CSI-RS CSI-RS2 with a one-bit flag "1" to the TRP TRP1, and reports the CSI-RS CSI-RS3 with a one-bit flag "0" to the TRP TRP2. Accordingly, the TRP TRP1 and/or the TRP TRP2 obtains that the CSI-RS CSI-RS2 is received via a Rx filter determined according to (i.e., is QCLed with a RS in) a preconfigured/fixed TCI state indicated in the CORESET CRST. That is, the Rx filter for receiving the CSI-RS CSI-RS2 is the same as the Rx filter for receiving the CORESET CRST. In addition, the TRP TRP1 and/or the TRP TRP2 obtains that the CSI-RS CSI-RS3 is not received via the Rx filter determined according to (i.e., is not QCLed with a RS in) the preconfigured/fixed TCI state indicated in the CORESET CRST. That is, the Rx filter for receiving the CSI-RS CSI-RS2 is different from the Rx filter for receiving the CORESET CRST.

Figure 16:
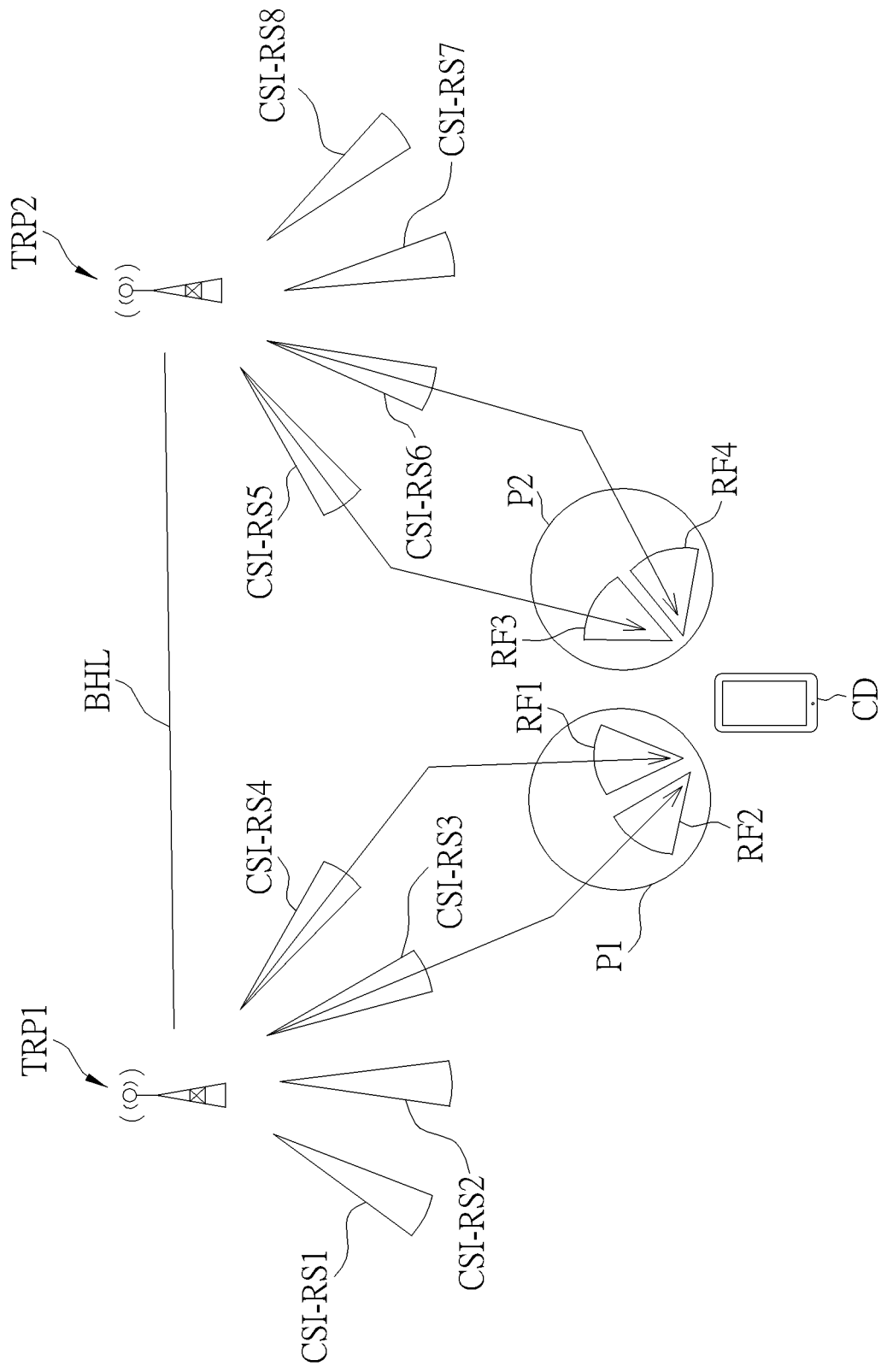
FIG. 16 is a schematic diagram of a reporting before a reception according to an example of the present invention.

FIG. 16 is a schematic diagram of a reporting before a reception according to an example of the present invention. Two TRPs TRP1-TRP2 communicate with each other according to (e.g., via) a backhaul BHL. The TRP TRP1 transmits (e.g., beamforms) CSI-RSs CSI-RS1-CSI-RS4 to a communication device CD, and the TRP TRP2 transmits (e.g., beamforms) CSI-RSs CSI-RS5-CSI-RS8 to the communication device CD. The communication device CD includes Rx filters RF1-RF4. The Rx filters RF1 and RF2 belong to a panel P1 of the communication device CD, and the Rx filters RF3 and RF4 belong to a panel P2 of the communication device CD. The communication device CD measures CSI-RSs CSI-RS1-CSI-RS4 according to (e.g., by using) the Rx filter RF1, and measures CSI-RSs CSI-RS5-CSI-RS8 according to (e.g., by using) the Rx filter RF2. Then, the communication device CD reports the CSI-RSs CSI-RS3 and CSI-RS4 in a first group CRG1 to the TRP TRP1, and reports the CSI-RS CSI-RS5 and CSI-RS6 in a second group CRG2 to the TRP TRP2, wherein the CSI-RSs CSI-RS3 and CSI-RS4 in the first group CRG1 may not be received simultaneously and the CSI-RSs CSI-RS5 and CSI-RS6 in the second group CRG2 may not be received simultaneously. That is, CSI-RSs in the same group not be received simultaneously, and CSI-RSs in different groups may be received simultaneously.

Figure 17:
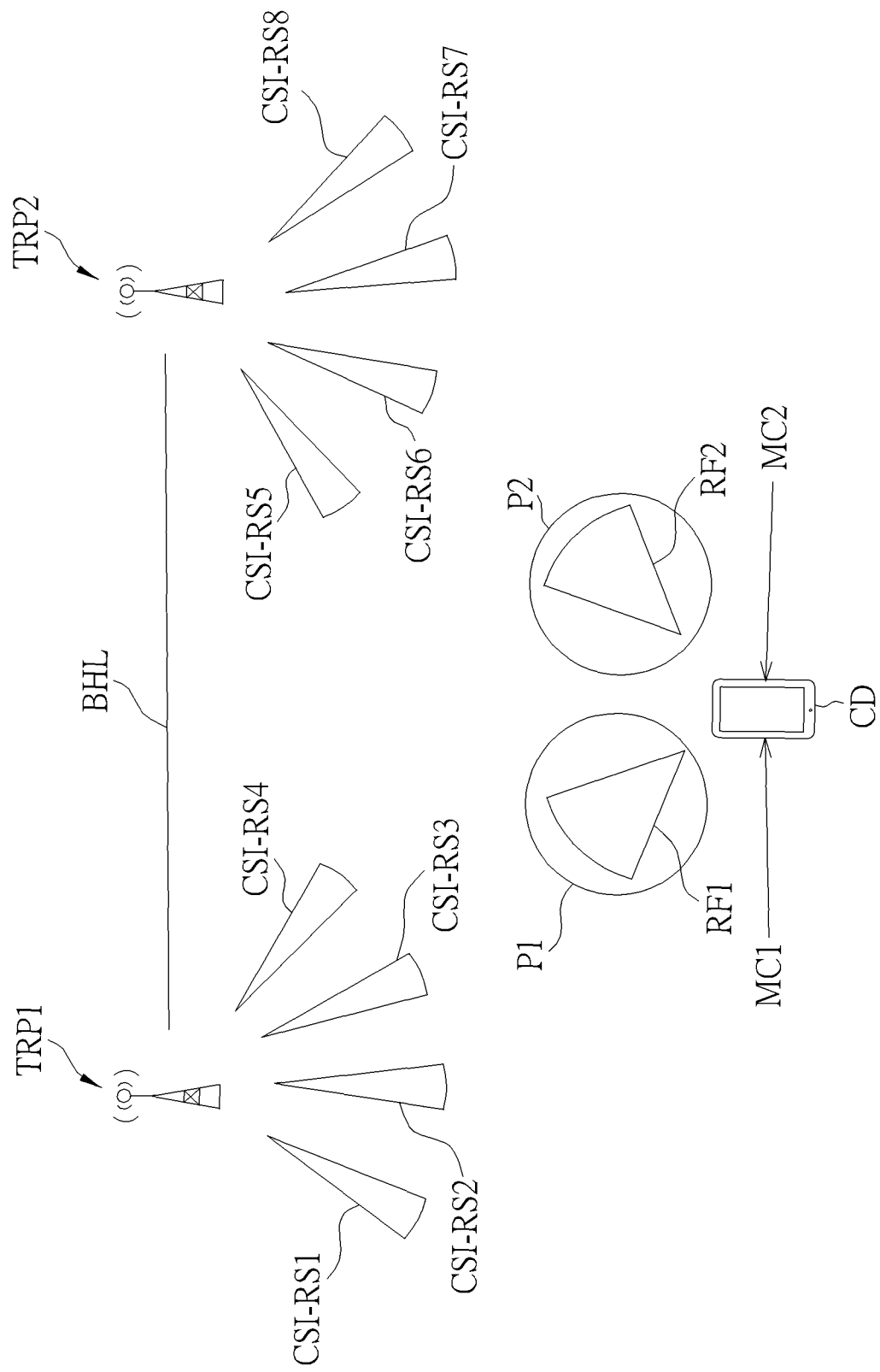
FIG. 17 is a schematic diagram of a reporting before a reception according to an example of the present invention.

FIG. 17 is a schematic diagram of a reporting before a reception according to an example of the present invention. Two TRPs TRP1-TRP2 communicate with each other via according to (e.g., via) a backhaul BHL. The TRP TRP1 transmits (e.g., beamforms) CSI-RSs CSI-RS1-CSI-RS4 to a communication device CD, and the TRP TRP2 transmits (e.g., beamforms) CSI-RSs CSI-RS5-CSI-RS8 to the communication device CD. The communication device CD includes Rx filters RF1-RF4. The Rx filters RF1 and RF2 belong to a panel P1 of the communication device CD, and the Rx filters RF3 and RF4 belong to a panel P2 of the communication device CD. The communication device CD is configured to perform two measurement reports according to two measurement configurations MC1 and MC2, wherein the measurement configuration MC1 is for measuring the CSI-RSs CSI-RS1-CSI-RS 4 and the measurement configuration MC2 is for measuring the CSI-RSs CSI-RS5-CSI-RS8. The communication device CD measures the CSI-RSs CSI-RS1-CSI-RS4 according to the measurement configuration MC1 according to (e.g., by using) the Rx filter RF1, and measures CSI-RSs CSI-RS5-CSI-RS8 according to the measurement configuration MC2 according to (e.g., by using) the Rx filter RF1. Then, the communication device CD reports the CSI-RSs CSI-RS3 and CSI-RS4 in a first report to the TRP TRP1, and reports the CSI-RS CSI-RS5 and CSI-RS6 in a second report to the TRP TRP2. Then, the communication device CD determines that CSI-RSs in different reports (e.g., the CSI-RSs CSI-RS3 and CSI-RS6, or the CSI-RSs CSI-RS4 and CSI-RS5) may be received simultaneously.

In the above examples, the TRP may be replaced by a cell, a serving cell, an unlicensed cell, an unlicensed serving cell, an unlicensed TRP, a gNB, an eNB, but is not limited herein.

In the above examples, the Rx filter may be replaced by a spatial Rx filter, a Rx beam, a spatial Rx parameter, a spatial domain Rx filter, but is not limited herein.

In the above examples, the beam may be replaced by an antenna, an antenna port, an antenna element, a group of antennas, a group of antenna ports, a group of antenna elements, a spatial domain filter, a reference signal resource, but is not limited herein. For example, a beam may be represented by an antenna port, a group of antenna ports or a spatial domain filter.

In the above examples, the operation of "determine" or "assume" described above may be replaced by the operation of "compute", "calculate", "obtain", "generate", "output", "use", "choose/select" or "decide". The operation of "transmit" described above may be replaced by the operation of "beamform" or "signal".

In the above examples, the term of "according to" described above may be replaced by "via" or "by using". The term of "via" described above may be replaced by "on", "in" or "at". The phrase of "corresponding to" described above may be replaced by "of" or "associated with".

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a communication device and method for handling a reception. The communication device knows how to receive the signal from the TRPs. As a result, efficiency of resource utilization is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a reception, comprising:
   at least one storage device; and
   at least one processing circuit, coupled to the at least one storage device, wherein the at least one storage device stores instructions, and the at least one processing circuit is configured to execute the instructions of:
   receiving a downlink (DL) control information (DCI) from a control resource set (CORESET); and
   receiving a physical DL shared channel (PDSCH) according to the DCI, wherein the DCI comprises a transmission configuration indicator (TCI) field, and the TCI field indicates a TCI codepoint corresponding to a first TCI state and a second TCI state;
   wherein the first TCI state is corresponding to a first code division multiplexing (CDM) group of at least one antenna port, and the second TCI state is corresponding to a second CDM group.

2. The communication device of claim 1, wherein the first CDM group comprises a first group of demodulation reference signal (DM-RS) ports, and the second CDM group comprises a second group of DM-RS ports.

3. The communication device of claim 1, wherein the instruction of receiving the PDSCH according to the DCI further comprises:
   determining that at least one DM-RS port of the PDSCH is quasi co-located (QCLed) with at least one RS with respect to at least one QCL parameter associated with a plurality of TCI states, wherein the plurality of TCI states are corresponding to the lowest codepoint among a plurality of TCI codepoints indicating at least two different TCI states.

4. The communication device of claim 3, wherein a offset between a first time instant for receiving the DCI and a second time instant for receiving the PDSCH is less than a threshold.

5. The communication device of claim 4, wherein the offset is indicated according to the DCI.

6. The communication device of claim 4, wherein the threshold is configured according to a higher layer signaling.

7. The communication device of claim 4, wherein the threshold comprises at least one orthogonal frequency division multiplexing (OFDM) symbol.

8. The communication device of claim 1, wherein the CORESET is configured according to a higher layer signaling.

9. The communication device of claim 1, wherein the first TCI state comprises at least one first QCL information.

10. The communication device of claim 9, wherein the at least one first QCL information comprises at least one of a RS and a QCL-type.

11. The communication device of claim 10, wherein the QCL-type comprises at least one of a time, a frequency and a spatial receive (Rx) parameter.

12. The communication device of claim 1, wherein the second TCI state comprises at least one second QCL information.

13. A communication device for handling a reception, comprising:
at least one storage device; and
at least one processing circuit, coupled to the at least one storage device, wherein the at least one storage device stores instructions, and the at least one processing circuit is configured to execute the instructions of:
receiving a downlink (DL) control information (DCI) from a control resource set (CORESET); and
receiving a physical DL shared channel (PDSCH) according to the DCI, wherein the CORESET is configured with a CORESET pool index;
wherein the instruction of receiving the PDSCH according to the DCI further comprises: determining that at least one demodulation reference signal (DM-RS) port of the PDSCH is quasi co-located (QCLed) with at least one RS with respect to at least one QCL parameter used for physical DL control channel (PDCCH) QCL indication of a CORESET with the lowest CORESET identity (ID) among at least one CORESET, wherein the at least one CORESET is configured with the same value of the CORESET pool index.

14. The communication device of claim 13, wherein the CORESET pool index is associated with a scrambling ID.

15. The communication device of claim 13, wherein a offset between a first time instant for receiving the DCI and a second time instant for receiving the PDSCH is less than a threshold.

16. The communication device of claim 15, wherein the offset is indicated according to the DCI.

17. The communication device of claim 15, wherein the threshold is configured according to a higher layer signaling.

18. The communication device of claim 15, wherein the threshold comprises at least one orthogonal frequency division multiplexing (OFDM) symbol.

19. The communication device of claim 13, wherein the CORESET is configured according to a higher layer signaling.

* * * * *